United States Patent
Ka et al.

(10) Patent No.: US 12,183,949 B2
(45) Date of Patent: Dec. 31, 2024

(54) SEPARATOR FOR SECONDARY BATTERY, MANUFACTURING METHOD THEREOF, METHOD FOR MANUFACTURING SECONDARY BATTERY COMPRISING THE SEPARATOR AND SECONDARY BATTERY MANUFACTURED BY THE METHOD

(71) Applicant: LG ENERGY SOLUTION, LTD., Seoul (KR)

(72) Inventors: Kyung-Ryun Ka, Daejeon (KR); Hye-Jin Kwon, Daejeon (KR); Seung-Hyun Lee, Daejeon (KR); Je-An Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 17/914,126

(22) PCT Filed: Jul. 15, 2021

(86) PCT No.: PCT/KR2021/009138
§ 371 (c)(1),
(2) Date: Sep. 22, 2023

(87) PCT Pub. No.: WO2022/019572
PCT Pub. Date: Jan. 27, 2022

(65) Prior Publication Data
US 2024/0039119 A1    Feb. 1, 2024

(30) Foreign Application Priority Data

Jul. 20, 2020   (KR) ........................ 10-2020-0089709

(51) Int. Cl.
*H01M 50/449*   (2021.01)
*H01M 10/0525*  (2010.01)
(Continued)

(52) U.S. Cl.
CPC ..... *H01M 50/449* (2021.01); *H01M 10/0585* (2013.01); *H01M 10/0587* (2013.01);
(Continued)

(58) Field of Classification Search
CPC ............. H01M 50/449; H01M 50/451; H01M 50/461; H01M 50/446
See application file for complete search history.

(56) References Cited

U.S. PATENT DOCUMENTS

| 2009/0142857 A1 | 6/2009 | Yen |
| 2012/0189897 A1 | 7/2012 | Wakizaka et al. |

(Continued)

FOREIGN PATENT DOCUMENTS

| CN | 101218696 A | 7/2008 |
| JP | 2015-28842 A | 2/2015 |

(Continued)

OTHER PUBLICATIONS

International Search Report (PCT/ISA/210) issued in PCT/KR2021/009138, dated Oct. 25, 2021.
(Continued)

*Primary Examiner* — Stephan J Essex
(74) *Attorney, Agent, or Firm* — Birch, Stewart, Kolasch & Birch, LLP

(57) ABSTRACT

A separator for a secondary battery comprising a porous polymer substrate; a first layer on at least one surface of the porous polymer substrate, wherein the first layer includes inorganic particles and a nonparticulate acrylic polymer having a glass transition temperature of 15° C. or less, wherein the nonparticulate acrylic polymer connects and fixes the inorganic particles; and a second layer on an upper surface of the first layer, wherein the second layer includes a particulate acrylic polymer having a glass transition temperature of 20° C. to 50° C. The separator for a secondary
(Continued)

battery has good adhesion with the electrode and can solve the resistance problem in the presence of the inorganic particles.

20 Claims, 7 Drawing Sheets

(51) Int. Cl.
    *H01M 10/0585*     (2010.01)
    *H01M 10/0587*     (2010.01)
    *H01M 50/42*     (2021.01)
    *H01M 50/443*     (2021.01)
    *H01M 50/446*     (2021.01)
    *H01M 50/46*     (2021.01)
    *H01M 50/491*     (2021.01)

(52) U.S. Cl.
    CPC ......... *H01M 50/42* (2021.01); *H01M 50/443* (2021.01); *H01M 50/446* (2021.01); *H01M 50/461* (2021.01); *H01M 50/491* (2021.01); *H01M 10/0525* (2013.01)

(56) References Cited

U.S. PATENT DOCUMENTS

| | | |
|---|---|---|
| 2015/0311490 A1 | 10/2015 | Murase et al. |
| 2015/0333308 A1 | 11/2015 | Toyoda et al. |
| 2016/0049828 A1 | 2/2016 | Kim et al. |
| 2018/0053963 A1 | 2/2018 | Tanaka |
| 2018/0315871 A1 | 11/2018 | Kwon et al. |
| 2018/0337381 A1 | 11/2018 | Seo et al. |
| 2020/0006733 A1* | 1/2020 | Cho ..................... H01M 50/42 |
| 2020/0152845 A1 | 5/2020 | Kim et al. |
| 2021/0066692 A1 | 3/2021 | Jeong et al. |

FOREIGN PATENT DOCUMENTS

| | | | |
|---|---|---|---|
| JP | 2015028842 A | * | 2/2015 |
| JP | 2015-88253 A | | 5/2015 |
| JP | 2018-48670 A | | 4/2018 |
| KR | 10-2015-0089000 A | | 8/2015 |
| KR | 10-2016-0020283 A | | 2/2016 |
| KR | 10-2017-0055440 A | | 5/2017 |
| KR | 10-2017-0095024 A | | 8/2017 |
| KR | 10-2017-0129639 A | | 11/2017 |
| KR | 10-2017-0129643 A | | 11/2017 |
| KR | 10-2019-0083894 A | | 7/2019 |
| KR | 10-2016-0118979 A | | 10/2019 |
| KR | 10-2020-0034470 A | | 3/2020 |

OTHER PUBLICATIONS

Korean Notice of Allowance dated Apr. 26, 2023 for Korean Application No. 10-2021-0093109 with English Translation and Verified Statement.

Korean Office Action dated Dec. 16, 2022 for Korean Application No. 10-2021-0093109 with English Translation and Verified Statement.

Extended European Search Report for European Application No. 21845906.3, dated Sep. 12, 2024.

* cited by examiner

SEPARATOR FOR SECONDARY BATTERY, MANUFACTURING METHOD THEREOF, METHOD FOR MANUFACTURING SECONDARY BATTERY COMPRISING THE SEPARATOR AND SECONDARY BATTERY MANUFACTURED BY THE METHOD

TECHNICAL FIELD

The present application claims priority to Korean Patent Application No. 10-2020-0089709 filed in the Republic of Korea on Jul. 20, 2020, the disclosure of which is incorporated herein by reference.

The present disclosure relates to a separator for a secondary battery, a manufacturing method thereof, a method for manufacturing a secondary battery comprising the separator and a secondary battery manufactured by the method.

BACKGROUND ART

Recently, there has been an increasing attention to energy storage technology day by day. As the application field of energy storage technology has been extended to mobile phones, camcorders, laptop computers, and even electric cars, there is growing demand for high energy density of batteries used as a power source of electronic devices. A secondary battery is the best battery that meets the demand, and many studies are being made on secondary batteries.

In general, a secondary battery comprises a positive electrode comprising a positive electrode active material, a negative electrode comprising a negative electrode active material, a non-aqueous electrolyte solution comprising an electrolyte salt and an organic solvent, and a separator interposed between the positive electrode and the negative electrode to electrically isolate them.

In the manufacture and use of the secondary battery, ensuring safety of the secondary battery is challenging. The separator commonly uses a polyolefin-based porous substrate, and due to its material characteristics and procedural characteristics, the separator exhibits severe thermal shrinkage behaviors in a high temperature situation, causing a safety problem such as an internal short circuit. Recently, to solve this problem, an organic-inorganic composite porous separator comprising a porous polymer substrate coated with a mixture of inorganic particles and a binder polymer has been proposed.

However, the organic-inorganic composite porous separator has insufficient interlayer adhesion in the step of stacking with the electrode to form an electrode assembly due to its material properties, and there is a risk that the separator and the electrode may be separated from each other.

To solve this problem, a technique of coating the mixture of the binder polymer on the separator and moving the binder polymer to the surface of the separator by a vapor-induced phase separation method to form an adhesive layer containing high content of binder polymer near the surface of the separator has been developed.

However, the vapor-induced phase separation method is difficult to adjust the humidity and consequently difficult to ensure processability, and the use of the organic solvent raises an environmental issue. Additionally, the binder polymer dissolved in the organic solvent penetrates into the pores of the porous polymer substrate.

Accordingly, there is still a high need for a separator for a secondary battery which can solve the above-described problem in the presence of inorganic particles and has good adhesion with electrode.

DISCLOSURE

Technical Problem

The present disclosure is directed to providing a separator for a secondary battery having good adhesion with electrode in the presence of inorganic particles and a method for manufacturing the same.

The present disclosure is further directed to providing a method for manufacturing a secondary battery comprising the separator and a secondary battery manufactured by the method.

Technical Solution

To solve the above-described problem, according to an aspect of the present disclosure, there are provided separators for secondary batteries of the following embodiments.

A first embodiment relates to a separator for a secondary battery comprising a porous polymer substrate; a first layer on at least one surface of the porous polymer substrate, wherein the first layer includes inorganic particles and a nonparticulate acrylic polymer having a glass transition temperature of 15° C. or less, wherein the nonparticulate acrylic polymer connects and fixes the inorganic particles; and a second layer on an upper surface of the first layer, wherein the second layer includes a particulate acrylic polymer having a glass transition temperature of 20° C. to 50° C.

In the first embodiment, according to a second embodiment, the glass transition temperature of the nonparticulate acrylic polymer may be 0° C. or less.

In the first or second embodiment, according to a third embodiment, the nonparticulate acrylic polymer may comprise a repeating unit comprising a first monomer and a repeating unit comprising a second monomer.

In the third embodiment, according to a fourth embodiment, the first monomer may comprise at least one of methyl methacrylate, ethyl methacrylate, n-butyl methacrylate, isobutyl methacrylate, or t-butyl methacrylate.

In the third or fourth embodiment, according to a fifth embodiment, the second monomer may comprise at least one of 2-ethyl hexyl methacrylate, lauryl methacrylate or octadecyl methacrylate.

In any one of the third to fifth embodiments, according to a sixth embodiment, the repeating unit comprising the second monomer may be present in an amount of 60 weight % or more based on 100 weight % of the nonparticulate acrylic polymer.

In any one of the first to sixth embodiments, according to a seventh embodiment, the particulate acrylic polymer may comprise a repeating unit comprising a third monomer and a repeating unit comprising a fourth monomer.

In the seventh embodiment, according to an eighth embodiment, the third monomer may comprise at least one of styrene, vinyl acetate or acrylonitrile.

In the seventh or eighth embodiment, according to a ninth embodiment, the fourth monomer may comprise at least one of methyl acrylate, ethyl acrylate, butyl acrylate, isobutyl acrylate, 2-ethyl hexyl acrylate or ethylene.

In any one of the seventh to ninth embodiments, according to a tenth embodiment, a weight ratio of the repeating unit comprising the third monomer and the repeating unit comprising the fourth monomer may be 1.5:8.5 to 4:6.

In any one of the first to tenth embodiments, according to an eleventh embodiment, an average particle size of the particulate acrylic polymer may be in a range of 200 nm to 800 nm.

In any one of the first to eleventh embodiments, according to a twelfth embodiment, a ratio of a density of the particulate acrylic polymer to a density of the inorganic particles may be 0.5 or less.

In any one of the first to twelfth embodiments, according to a thirteenth embodiment, a density of the particulate acrylic polymer may be 1.5 g/m$^3$ or less.

In any one of the first to thirteenth embodiments, according to a fourteenth embodiment, a density of the inorganic particles may be 2.0 g/m$^3$ or more.

In any one of the first to fourteenth embodiments, according to a fifteenth embodiment, the separator for a secondary battery may have an adhesion strength with an electrode of 30 gf/25 mm to 200 gf/25 mm.

In any one of the first to fifteenth embodiments, according to a sixteenth embodiment, an air permeability of the separator for a secondary battery may be in a range of 10 sec/100 cc to 300 sec/100 cc.

In any one of the first to sixteenth embodiments, according to a seventeenth embodiment, an adhesion strength between the porous polymer substrate and the first layer may be 10 gf/15 mm to 300 gf/15 mm.

To solve the above-described problem, according to an aspect of the present disclosure, there is provided a secondary battery of the following embodiment.

An eighteenth embodiment relates to a secondary battery comprising a positive electrode, a negative electrode and a separator interposed between the positive electrode and the negative electrode, wherein the separator is the separator for a secondary battery of any one of the first to seventeenth embodiments.

To solve the above-described problem, according to an aspect of the present disclosure, there are provided a method for manufacturing a secondary battery of the following embodiment and a secondary battery manufactured by the method.

A nineteenth embodiment relates to a method for manufacturing a secondary battery comprising interposing the separator for a secondary battery of any one of the first to seventeenth embodiments between a positive electrode and a negative electrode and laminating the positive electrode, separator, and negative electrode by heat and pressure.

A twentieth embodiment relates to a secondary battery manufactured by the manufacturing method of the nineteenth embodiment.

Advantageous Effects

The separator for a secondary battery according to an embodiment of the present disclosure comprises the second layer comprising the particulate acrylic polymer having the glass transition temperature of 20° C. to 50° C. on the upper surface of the first layer comprising inorganic particles, to have good adhesion with electrode in the presence of the inorganic particles.

Additionally, since the separator for a secondary battery according to an embodiment of the present disclosure uses the particulate acrylic polymer having the glass transition temperature of 20° C. to 50° C., it is possible to form the second layer without clogging the pores of the first layer, thereby solving the resistance problem.

BRIEF DESCRIPTION OF THE DRAWINGS

The accompanying drawings illustrate preferred embodiments of the present disclosure and, together with the foregoing disclosure, serve to provide further understanding of the technical spirit of the present disclosure. However, the present disclosure is not to be construed as being limited to the drawings.

DETAILED DESCRIPTION

Figure 1:
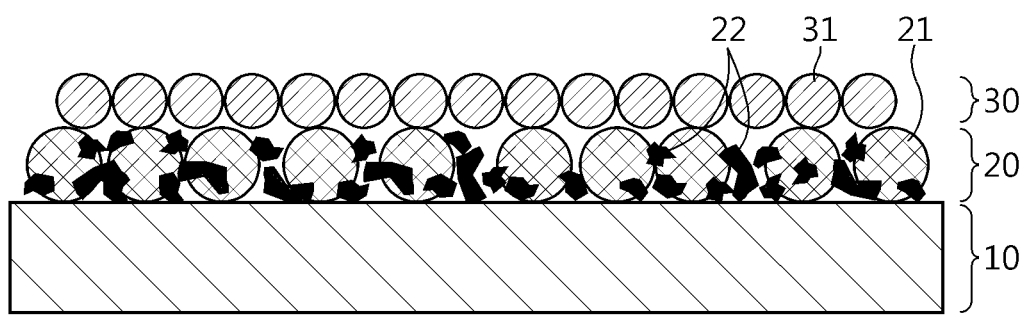
FIG. 1 is a cross-sectional view of a separator for a secondary battery according to an embodiment of the present disclosure.
Figure 2:
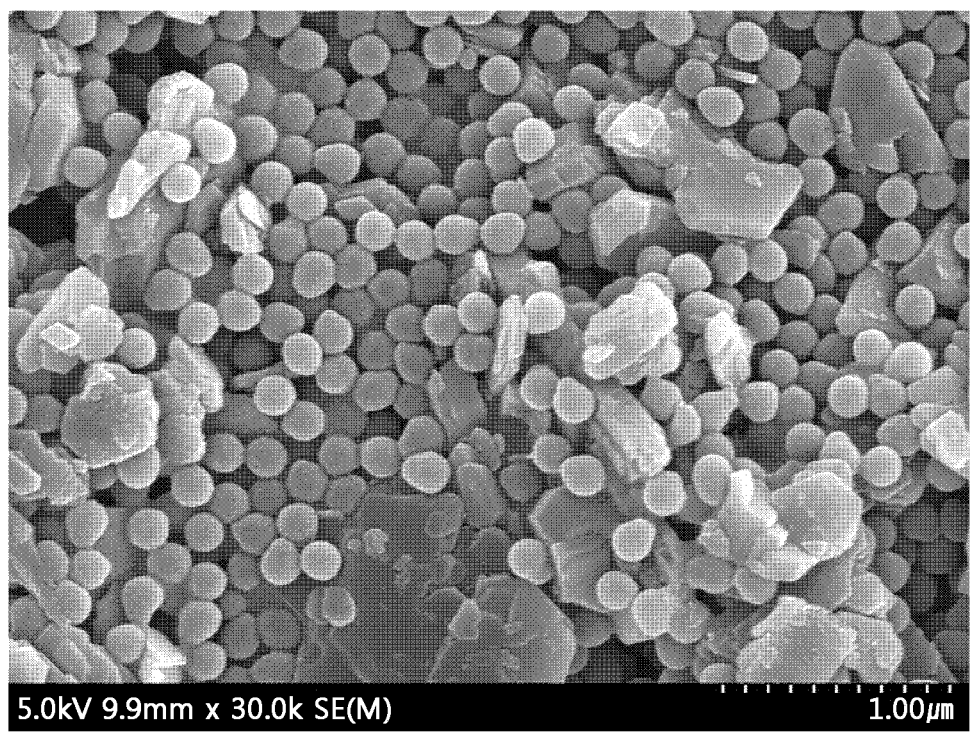
FIG. 2 is a scanning electron microscope (SEM) image of a particulate acrylic polymer used in a second layer in example 1.
Figure 3:
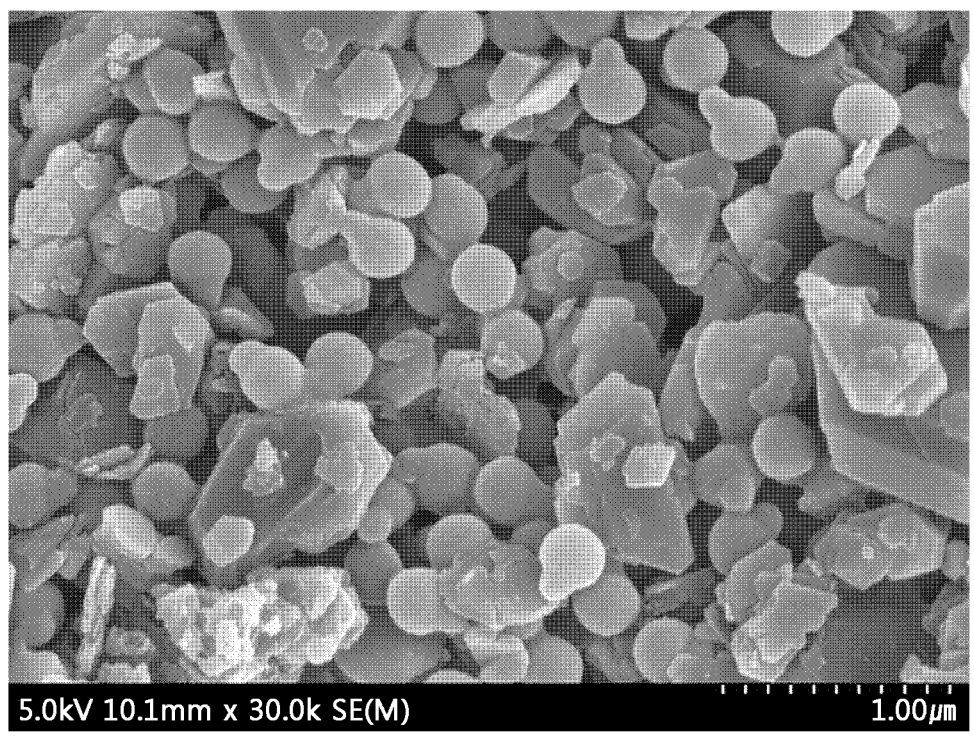
FIG. 3 is a SEM image of a particulate acrylic polymer used in a second layer in example 2.
Figure 4:
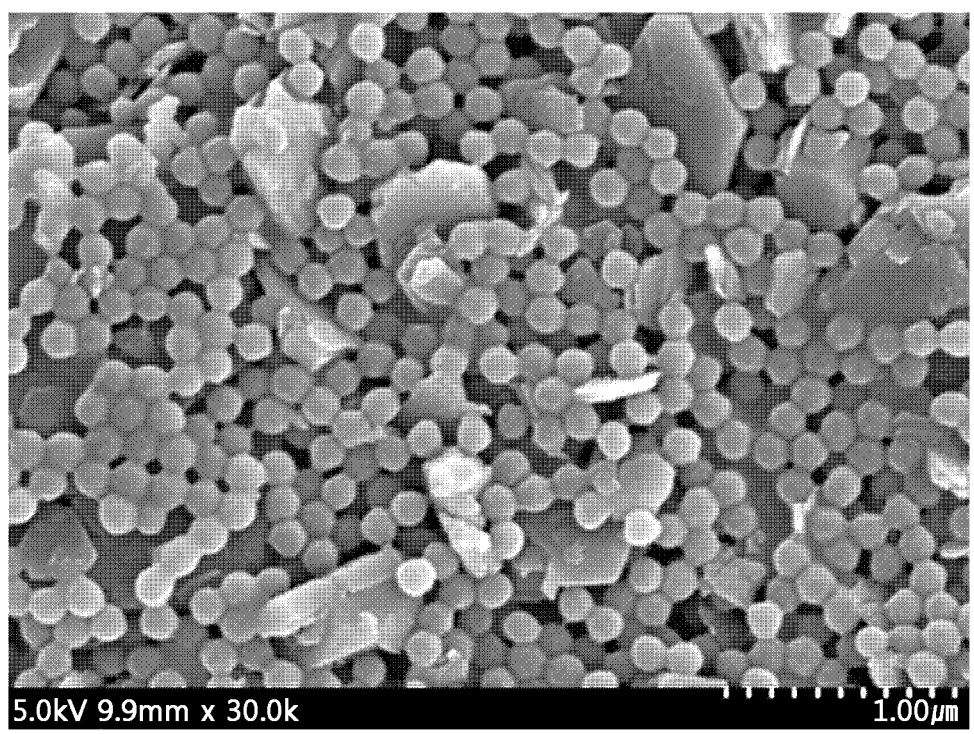
FIG. 4 is a SEM image of a particulate acrylic polymer used in a second layer in example 3.
Figure 5:
FIG. 5 is a SEM image of an acrylic polymer used in a second layer in comparative example 2.
Figure 6:
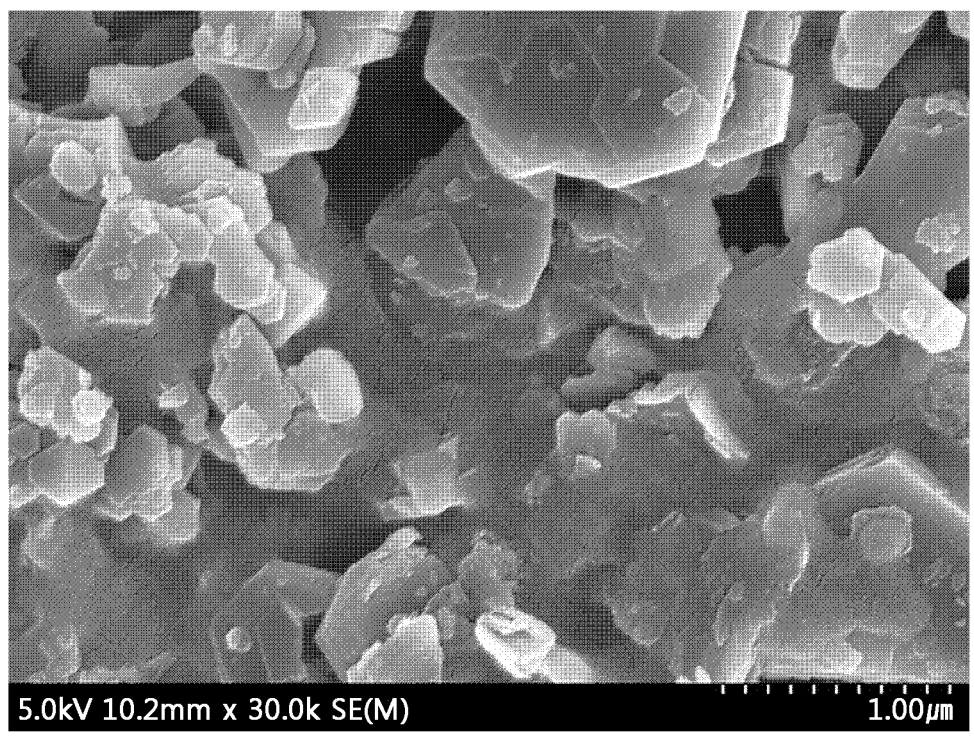
FIG. 6 is a SEM image of an acrylic polymer used in a second layer in comparative example 3.
Figure 7:
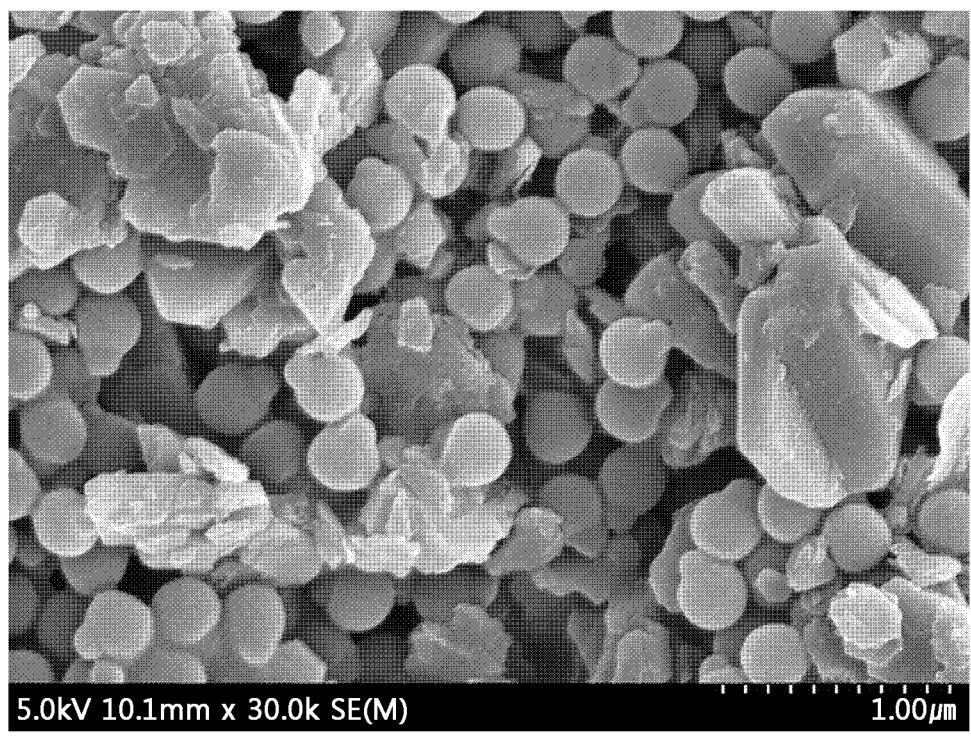
FIG. 7 is a SEM image of a particulate acrylic polymer used in a second layer in comparative example 4.

Hereinafter, preferred embodiments of the present disclosure will be described in detail with reference to the accompanying drawings. Prior to the description, it should be understood that the terms or words used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the embodiments described herein and the elements shown in the drawings are just a most preferred embodiment of the present disclosure, and are not intended to fully describe the technical aspects of the present disclosure, so it should be understood that a variety of other equivalents and modifications could have been made thereto at the time that the application was filed.

Particular terms used in the following detailed description of the present disclosure are provided for convenience, but not intended to limit the present disclosure. In the specification, 'one surface' or 'upper surface' indicates positions and orientations in the corresponding drawings and is not limited thereto. These terms include the above-listed words, their derivatives and words having similar meanings.

Throughout the specification, it will be understood that when a layer is referred to as being on "upper surface" of another layer, the layer may be placed in contact with a surface of the other layer, and intervening layers may be present.

A separator for a secondary battery according to an embodiment of the present disclosure comprises:
   a porous polymer substrate;
   a first layer formed on at least one surface of the porous polymer substrate, and comprising inorganic particles and a nonparticulate acrylic polymer having the glass transition temperature of 15° C. or less, wherein the nonparticulate acrylic polymer connects and fixes the inorganic particles; and a second layer formed on an upper surface of the first layer, and comprising a particulate acrylic polymer having the glass transition temperature of 20° C. to 50° C.

FIG. 1 is a schematic view of the separator for a secondary battery an embodiment of the present disclosure.

Referring to FIG. 1, the separator 1 for a secondary battery comprises the porous polymer substrate 10.

In an embodiment of the present disclosure, the porous polymer substrate 10 may include any material of separators for secondary batteries commonly in the corresponding technical field without limitations. The porous polymer substrate may be a thin film comprising a polymer material, and non-limiting examples of the polymer material may include at least one polymer resin of polyolefin, polyethyleneterephthalate, polybutyleneterephthalate, polyacetal, polyamide, polycarbonate, polyimide, polyetheretherketone, polyethersulfone, polyphenyleneoxide, polyphenylenesulfide or polyethylenenaphthalene. Additionally, the porous polymer substrate may include a non-woven fabric or a porous polymer film made of the above-described polymer material or a stack of two or more of them. Specifically, the porous polymer substrate may be any one of the following a) to e).

a) a porous film formed by melting and extruding a polymer resin, b) a multilayer film formed by stacking the porous film of a) in two or more layers, c) a non-woven web made of filaments obtained by melting/spinning a polymer resin, d) a multilayer film formed by stacking the non-woven web of c) in two or more layers, e) a porous composite film of multilayer structure comprising at least two of the a) to d).

In an embodiment of the present disclosure, the thickness of the porous polymer substrate 10 may be 5 μm to 50 μm, but is not limited thereto. When the thickness of the porous polymer substrate is in the above-described range, it is easier to prevent the problem that the separator is vulnerable to damage while the battery is in use. Meanwhile, there is no limitation on the average pore size and the porosity in the porous polymer substrate, but the average pore size may be 0.01 μm to 50 μm and the porosity may be 10% to 95%.

In the present disclosure, the porosity and the average pore size of the porous polymer substrate 10 may be measured by a 6-point BET method according to a nitrogen gas adsorption-flow method, scanning electron microscope (SEM) image, Mercury porosimeter, capillary flow porometer, or porosimetry analyzer (Bell Japan Inc, Belsorp-II mini).

Referring to FIG. 1, the separator 1 for a secondary battery comprises a first layer on at least one surface of the porous polymer substrate 10. Specifically, the first layer may be formed on one or both surfaces of the porous polymer substrate 10.

The first layer 20 comprises inorganic particles 21, and a nonparticulate acrylic polymer 22 which has the glass transition temperature of 15° C. or less and connects and fixes the inorganic particles 21. The inorganic particles 21 of the first layer 20 may prevent the porous polymer substrate 10 from exhibiting severe thermal shrinkage behaviors at high temperature, thereby improving safety of the separator.

The inorganic particles 21 may include, without limitation, any type of inorganic particle that is electrochemically stable. That is, the inorganic particles 21 that may be used in the present disclosure may include, without limitation, any type of inorganic particle that does not cause oxidation and/or reduction reactions in the operating voltage range (for example, 0~5V vs Li/Li$^+$) of the battery applied. In particular, the use of high dielectric constant inorganic particles as the inorganic particles 21 may contribute to the increased degree of dissociation of an electrolyte salt, for example, a lithium salt, in a liquid electrolyte, thereby improving the ionic conductivity of the electrolyte solution. In an embodiment of the present disclosure, the inorganic particles 21 may comprise high dielectric constant inorganic particles having the dielectric constant of 5 or more, or preferably 10 or more. Non-limiting examples of the inorganic particle having the dielectric constant of 5 or more may include at least one of $BaTiO_3$, $Pb(Zr,Ti)O_3$ (PZT), $Pb_{1-x}La_xZr_{1-y}Ti_yO_3$ (PLZT, $0<x<1$, $0<y<1$), $Pb(Mg_{1/3}Nb_{2/3})O_3$—$PbTiO_3$ (PMN-PT), hafnia ($HfO_2$), $SrTiO_3$, $SnO_2$, $CeO_2$, MgO, $Mg(OH)_2$, NiO, CaO, ZnO, $ZrO_2$, $SiO_2$, $Y_2O_3$, $Al_2O_3$, AlOOH, $Al(OH)_3$, SiC or $TiO_2$.

Additionally, in another embodiment of the present disclosure, the inorganic particles 21 may include inorganic particles capable of transporting a lithium ion, i.e., inorganic particles that contain lithium but do not store lithium and have a function of moving a lithium ion. Non-limiting examples of the inorganic particles capable of transporting a lithium ion may include at least one of lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$ based glass ($0<x<4$, lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), lithium nitride ($Li_xN_y$, $0<y<2$), $SiS_2$ based glass ($Li_xSi_yS_z$, $0<x<3$, $0<y<2$, $0<z<4$) or $P_2S_5$ based glass ($Li_xP_yS_z$, $0<x<3$, $0<y<3$, $0<z<7$).

In an embodiment of the present disclosure, there is no limitation on the average particle size of the inorganic particles 21, but the inorganic particles 21 may have the average particle size of 0.01 to 10 μm, or 0.05 to 1.0 μm, or 0.2 to 1.0 μm, or 0.5 to 1.0 μm to form the first layer with a uniform thickness and ensure the optimal porosity. When the average particle size of the inorganic particles 21 satisfies the above-described range, dispersion is easier to be maintained, which makes it easy to control the properties of the separator, and it is easier to prevent the increased thickness of the first layer 20, thereby improving the mechanical properties. Additionally, it is easier to reduce the probability that an internal short circuit occurs during charging/discharging of the battery due to too much large pore size.

In this instance, the average particle size of the inorganic particles 21 refers to $D_{50}$, and "particle size $D_{50}$" refers to the particle size at 50% in the cumulative particle size distribution. The particle size may be measured using a laser diffraction method. Specifically, after powder to be measured is dispersed in a dispersing medium and introduced into commercially available laser diffraction particle size measurement equipment (for example, Microtrac S3500), the particle size distribution is calculated by measuring a diffraction pattern difference according to the particle size when particles pass through a laser beam. The particle size $D_{50}$ may be measured by calculating the particle diameter at 50% in the cumulative particle size distribution in the measurement device.

In the present disclosure, the term 'nonparticulate acrylic polymer' refers to an acrylic polymer that does not have a particulate shape used in the first layer, and is used to distinguish from the particulate acrylic polymer included in the second layer. The nonparticulate acrylic polymer 22 adheres the inorganic particles 21 to each other to keep the inorganic particles 21 held together (i.e., the nonparticulate acrylic polymer connects and fixes the inorganic particles), and bonds the inorganic particles 21 and the porous polymer substrate 10 together.

The glass transition temperature of the nonparticulate acrylic polymer 22 is 15° C. or less. The nonparticulate acrylic polymer 22 having the glass transition temperature of 15° C. or less does not have a particulate shape, and gets entangled with the inorganic particles 21 to form the first layer 20 on at least one surface of the porous polymer substrate 10. Accordingly, it is possible to ensure adhesion between the porous polymer substrate 10 and the first layer 20 by the nonparticulate acrylic polymer 22. Additionally, since the nonparticulate acrylic polymer 22 has a relatively low glass transition temperature, it may be advantageous in ensuring adhesion between the porous polymer substrate 10 and the first layer 20.

In an embodiment of the present disclosure, the glass transition temperature of the nonparticulate acrylic polymer 22 may be 12° C. or less, or 8° C. or less, or 0° C. or less, or −40° C. or less, or −80° C. to 12° C., or −80° C. to 8° C., or −40° C. to 8° C., or −80° C. to 0° C., or −40° C. to 0° C. As the glass transition temperature of the nonparticulate acrylic polymer 22 is lower, it may be more advantageous in ensuring adhesion between the porous polymer substrate 10 and the first layer 20.

In the specification, the glass transition temperature may be measured using differential scanning calorimetry (DSC). Specifically, the glass transition temperature may be measured at the temperature increase rate of 10° C./min (−50° C. to 250° C.) using DSC. For example, the glass transition temperature may be measured using DSC 250 (TA).

The glass transition temperature of the nonparticulate acrylic polymer 22 may differ depending on the type of monomer used in making the nonparticulate acrylic polymer 22.

In an embodiment of the present disclosure, the nonparticulate acrylic polymer 22 may comprise a repeating unit derived from a first monomer and a repeating unit derived from a second monomer.

In an embodiment of the present disclosure, the first monomer may comprise at least one of methyl methacrylate, ethyl methacrylate, n-butyl methacrylate, isobutyl methacrylate or t-butyl methacrylate.

In an embodiment of the present disclosure, the second monomer may comprise at least one of 2-ethyl hexyl methacrylate, lauryl methacrylate or octadecyl methacrylate.

In an embodiment of the present disclosure, the nonparticulate acrylic polymer may comprise a repeating unit derived from methyl methacrylate and a repeating unit derived from 2-ethyl hexyl methacrylate.

Even though the same type of monomer is used to make the nonparticulate acrylic polymer 22, the glass transition temperature of the nonparticulate acrylic polymer 22 may differ depending on each monomer content.

In an embodiment of the present disclosure, the repeating unit derived from the second monomer may be included in an amount of 60 weight % or more, or 90 weight % or more, or 95 weight or more based on 100 weight % of the nonparticulate acrylic polymer. When the amount of the repeating unit derived from the second monomer satisfies the above-described range, since the amount of the second monomer having lower glass transition temperature than the first monomer is higher than the amount of the first monomer, it may be more advantageous in ensuring adhesion of the first layer 20 with the porous polymer substrate 10.

In an embodiment of the present disclosure, a weight ratio of the inorganic particles 21 and the nonparticulate acrylic polymer 22 included in the first layer 20 may be determined considering the thickness, the average pore size and porosity of the finally formed first layer 20.

In an embodiment of the present disclosure, the weight ratio of the inorganic particles 21 and the nonparticulate acrylic polymer 22 may be 20:80 to 99.9:0.1, or 50:50 to 99.5:0.5. When the weight ratio of the inorganic particles 21 and the nonparticulate acrylic polymer 22 is in the above-described range, it is easier to ensure sufficient adhesion between the inorganic particles 21 and sufficient void spaces formed between the inorganic particles 21. Additionally, the finally formed first layer 20 may have good mechanical properties.

In an embodiment of the present disclosure, the first layer 20 may have the thickness in the range of 1 μm to 50 μm, or 2 μm to 30 μm, or 2 μm to 20 μm.

In an embodiment of the present disclosure, the average pore size of the first layer may range 0.001 to 10 μm, or 0.001 to 1 μm. Additionally, the porosity of the first layer 20 may range between 5 and 95%, 10 and 95%, 20 and 90%, or 30 and 80%. The porosity corresponds to a value obtained by subtracting the volume converted from the weight and density of each component of the first layer from the volume calculated using the thickness, width and height of the first layer.

Meanwhile, in the present disclosure, the porosity and the average pore size of the first layer 20 may be measured by a 6-point BET method according to a nitrogen gas adsorption-flow method, SEM image, Mercury porosimeter, capillary flow porometer or porosimetry analyzer (Bell Japan Inc, Belsorp-II mini).

In an embodiment of the present disclosure, the first layer 20 may further include a dispersing agent.

The dispersing agent may be used to improve the dispersion of the inorganic particles 21. Specifically, in an embodiment of the present disclosure, the dispersing agent may comprise at least one of carboxymethyl cellulose (CMC), polyacrylic acid (PAA) or polymethacrylic acid (PMAA), but is not limited thereto.

Referring to FIG. 1, the separator 1 for a secondary battery comprises a second layer 30 on the upper surface of the first layer 20. The second layer 30 give the adhesive property to the separator 1 to allow for good adhesion of the surface of the separator 1 with the electrode.

The second layer 30 comprises a particulate acrylic polymer 31 having the glass transition temperature of 20° C. to 50° C. In the adhesion of the electrode and the separator, the shape of the particulate acrylic polymer 31 is changed by lamination, thereby obtaining adhesion between the electrode and the separator. In the present disclosure, the term 'particulate acrylic polymer' refers to an acrylic polymer exhibiting a particulate shape included in the second layer, and is used to distinguish from the nonparticulate acrylic polymer 22 included in the first layer.

In the present disclosure, the particulate acrylic polymer 31 has the glass transition temperature of 20° C. or more, and independently exhibits a particulate shape.

In an embodiment of the present disclosure, due to its lower density than the inorganic particles 21, the particulate acrylic polymer 31 may move to the upper part of the inorganic particles in the coating process to form the second layer 30 on the upper surface of the first layer 20 comprising the inorganic particles 21.

In contrast, in the present disclosure, when the glass transition temperature of the particulate acrylic polymer 31 exceeds 50° C., the particulate acrylic polymer 31 has a particulate shape, but in the adhesion of the electrode and the separator 1, the particulate shape is not changed by lamination, which makes it difficult to obtain adhesion between the separator and the electrode.

In an embodiment of the present disclosure, the glass transition temperature of the particulate acrylic polymer 31 may be 30° C. to 45° C. When the glass transition temperature of the particulate acrylic polymer 31 is 30° C. to 45° C., it is easier to improve the air permeability of the separator 1 and the adhesion with electrode by adjusting the extent of shape change of the particulate acrylic polymer by the lamination of the electrode and the separator 1.

In an embodiment of the present disclosure, a ratio of the density of the particulate acrylic polymer 31 to the density of the inorganic particles 21 may be 0.5 or less, or 0.45 or less, or 0.42 or less. For example, the density of the particulate acrylic polymer: the density of the inorganic particles may be 0.5:1 or less, or 0.45:1 or less, or 0.42:1 or less. When the ratio of the density of the particulate acrylic polymer 31 to the density of the inorganic particles 21 is in the above-described range, it is easier the particulate acrylic polymer 31 to move to the upper part of the inorganic particles in the coating process due to a difference in density between the particulate acrylic polymer 31 and the inorganic particles 21, which makes it easier to form the second layer 30 on the upper surface of the first layer 20 comprising the inorganic particles 21.

In the present disclosure, the density of the inorganic particles 21 refers to the true density. The true density refers to the density over the volume of particles except the gap between particles. In an embodiment of the present disclosure, the density of the inorganic particles 21 may be measured by the commonly used true density measurement method, and for example, and may be measured using Micromeritics AccuPycII-1340.

In an embodiment of the present disclosure, the density value of the inorganic particles 21 may be 2.0 $g/m^3$ or more, or 2 $g/cm^3$ to 6 $g/cm^3$, or 2 $g/cm^3$ to 4 $g/cm^3$.

In the present disclosure, the density of the particulate acrylic polymer 31 refers to the true density. In an embodiment of the present disclosure, the density of the particulate acrylic polymer 31 may be measured by the commonly used true density measurement method, and for example, may be measured using Micromeritics AccuPycII-1340.

In an embodiment of the present disclosure, the density value of the particulate acrylic polymer 31 may be 1.5 $g/m^3$ or less, or 0.5 $g/cm^3$ to 1.5 $g/cm^3$, or 1 $g/cm^3$ to 1.2 $g/cm^3$.

In an embodiment of the present disclosure, the density value of the particulate acrylic polymer 31 may be 1.5 $g/m^3$ or less, and the density value of the inorganic particles may be 2.0 $g/m^3$ or more. When the density values of the particulate acrylic polymer 31 and the inorganic particles 21 satisfy the above-described ranges, the particulate acrylic polymer 31 is easier to move to the upper part of the inorganic particles in the coating process due to a difference in density between the particulate acrylic polymer 31 and the inorganic particles 21, which makes it easier to form the second layer 30 on the upper surface of the first layer 20 comprising the inorganic particles 21.

The glass transition temperature of the particulate acrylic polymer 31 may differ depending on the type of monomer used to make the particulate acrylic polymer 31.

In an embodiment of the present disclosure, the particulate acrylic polymer may comprise a repeating unit derived from a third monomer and a repeating unit derived from a fourth monomer.

In an embodiment of the present disclosure, the third monomer may comprise at least one of styrene, vinyl acetate or acrylonitrile.

In an embodiment of the present disclosure, the fourth monomer may comprise at least one of methyl acrylate, ethyl acrylate, butyl acrylate, isobutyl acrylate, 2-ethyl hexyl acrylate or ethylene.

In an embodiment of the present disclosure, the particulate acrylic polymer may comprise a repeating unit derived from styrene and a repeating unit derived from butyl acrylate.

Even though the same type of monomer is used to make the particulate acrylic polymer 31, the glass transition temperature of the particulate acrylic polymer 31 may differ depending on each monomer content.

In an embodiment of the present disclosure, a weight ratio of the repeating unit derived from the third monomer and the repeating unit derived from the fourth monomer may be 1.5:8.5 to 4:6, or 2:8 to 4:6, or 2.5:7.5 to 3:7. When the weight ratio of the repeating unit derived from the third monomer and the repeating unit derived from the fourth monomer satisfies the above-described range, it may be more advantageous in ensuring adhesion of the second layer 30 with the electrode.

In an embodiment of the present disclosure, the average particle size of the particulate acrylic polymer 31 may be 200 nm to 800 nm, 250 to 500 nm, or 300 to 450 nm. When the average particle size of the particulate acrylic polymer 31 is in the above-described range, it is easier to make the particulate acrylic polymer 31, and the adhesion area with the electrode increases, thereby obtaining better adhesion between the second layer 30 comprising the particulate acrylic polymer 31 and the electrode.

In the present disclosure, the average particle size of the particulate acrylic polymer 31 refers to $D_{50}$, and "particle size $D_{50}$" refers to the particle size at 50% in the cumulative particle size distribution. The particle size may be measured using a laser diffraction method. Specifically, after powder to be measured is dispersed in a dispersing medium and introduced into commercially available laser diffraction particle size measurement equipment (for example, Microtrac S3500), the particle size distribution is calculated by measuring a diffraction pattern difference according to the particle size when particles pass through a laser beam. The particle size $D_{50}$ may be measured by calculating the particle diameter at 50% in the cumulative particle size distribution in the measurement device.

The separator 1 for a secondary battery according to an embodiment of the present disclosure comprises two types of acrylic polymers: the particulate acrylic polymer 31 having the glass transition temperature of 20° C. to 50° C. in the second layer 30, and the nonparticulate acrylic polymer 22 having the glass transition temperature of 15° C. or less in the first layer 20. Accordingly, the separator 1 has good adhesion with the electrode, and ensures adhesion between the first layer 20 and the porous polymer substrate 10.

Additionally, the separator 1 for a secondary battery according to the present disclosure uses the particulate acrylic polymer 31 in the second layer 30, thereby preventing the particulate acrylic polymer 31 from clogging the pores of the first layer 20, resulting in good air permeability, and solving the resistance problem.

In an embodiment of the present disclosure, the adhesion strength of the separator 1 for a secondary battery with the electrode may be 30 to 200 gf/25 mm, or 30 to 100 gf/25 mm, or 35 to 60 gf/25 mm, or 40 to 60 gf/25 mm.

In an embodiment of the present disclosure, the adhesion strength of the separator 1 for a secondary battery with the electrode may be measured from a strength when peeling a separator part of a sample at an angle of 180° at the rate of 25 mm/min at 25° C. after manufacturing the sample by lamination of the electrode and the separator in the conditions of 60° C., 6.5 MPa using a press, and attaching and fixing the sample to a glass plate using a double-sided tape.

In an embodiment of the present disclosure, the air permeability of the separator 1 for a secondary battery may be 10 to 300 sec/100 cc, or 100 to 300 sec/100 cc, or 110 to 200 sec/100 cc, or 100 to 160 sec/100 cc.

In an embodiment of the present disclosure, the air permeability of the separator 1 for a secondary battery is a Gurley value, and may refer to the time (sec) required for air of 100 cc to pass through 1 in$^2$ section of the separator under the pressure of 12.2 inH$_2$O, i.e., air permeation time. The air permeability of the separator 1 for a secondary battery may be measured by ASTM D726-94 method.

In an embodiment of the present disclosure, the adhesion strength between the porous polymer substrate 10 and the first layer 20 may be 10 to 300 gf/15 mm, or 40 to 100 gf/15 mm.

In an embodiment of the present disclosure, the adhesion strength between the porous polymer substrate 10 and the first layer 20 may be measured by fixing the separator 1 to a glass plate using a double-sided tape, firmly attaching a tape (3M transparent tape) to the exposed first layer 20, and measuring a force (gf/15 mm) necessary to peel off the tape using tensile strength measurement equipment. For example, the tensile strength measurement equipment may be 1 loyd LS-1.

The separator for a secondary battery according to an embodiment of the present disclosure may be manufactured by the following manufacturing method, but is not limited thereto.

The method for manufacturing a separator for a secondary battery according to an embodiment of the present disclosure comprises:

(S1) preparing a porous polymer substrate;
(S2) preparing an aqueous slurry comprising inorganic particles, a nonparticulate acrylic polymer having the glass transition temperature of 15° C. or less, and a particulate acrylic polymer having the glass transition temperature of 20° C. to 50° C.;
(S3) coating the aqueous slurry on at least one surface of the porous polymer substrate; and
(S4) drying the result of the (S3).

Hereinafter, the method for manufacturing a separator for a secondary battery according to an embodiment of the present disclosure will be described based on the main parts.

To begin with, the porous polymer substrate is prepared. The porous polymer substrate may be used as described above, and the porous polymer substrate may be made from the above-described material by forming pores through a method commonly used in the corresponding technical field, for example, a wet method using a solvent and a pore forming agent or a dry method using a stretching process, to ensure good air permeability and porosity.

Subsequently, the aqueous slurry comprising the inorganic particles, the nonparticulate acrylic polymer having the glass transition temperature of 15° C. or less and the particulate acrylic polymer having the glass transition temperature of 20° C. to 50° C. is prepared.

In the aqueous slurry, water serves as a dispersion medium of the nonparticulate acrylic polymer and the particulate acrylic polymer. The method for manufacturing a separator for a secondary battery according to an embodiment of the present disclosure is eco-friendly due to the use of the water dispersible nonparticulate acrylic polymer and particulate acrylic polymer.

In an embodiment of the present disclosure, for details of the inorganic particles, the nonparticulate acrylic polymer having the glass transition temperature of 15° C. or less and the particulate acrylic polymer having the glass transition temperature of 20° C. to 50° C., a reference is made to the above description.

In an embodiment of the present disclosure, the aqueous slurry may be prepared by dispersing the nonparticulate acrylic polymer and the particulate acrylic polymer in water, and adding and dispersing the inorganic particles. The inorganic particles may be added in a pre-pulverized state to have a predetermined average particle size, or the inorganic particles may be added to a solution in which the nonparticulate acrylic polymer and the particulate acrylic polymer are dispersed, and pulverized and dispersed while controlling to have a predetermined average particle size using a ball-mill method.

In an embodiment of the present disclosure, a weight ratio of the inorganic particles, the nonparticulate acrylic polymer having the glass transition temperature of or less and the particulate acrylic polymer having the glass transition temperature or 20° C. to 50° C. in the aqueous slurry may be 70:1:29 to 80:5:15. When the weight ratio of the inorganic particles, the nonparticulate acrylic polymer having the glass transition temperature of 15° C. or less, and the particulate acrylic polymer having the glass transition temperature of 20° C. to 50° C. is in the above-described range, it is easier to minimize the resistance rise caused by the clogged pores of the porous polymer substrate by the nonparticulate acrylic polymer, and ensure adhesion between the inorganic particles and the porous polymer substrate.

In an embodiment of the present disclosure, the aqueous slurry may further comprise a dispersing agent. For details of the dispersing agent, a reference is made to the above description.

Subsequently, the aqueous slurry is coated on at least one surface of the porous polymer substrate.

In an embodiment of the present disclosure, the method of coating the aqueous slurry on at least one surface of the porous polymer substrate to form the first layer is not limited to a particular method and may include methods commonly used in the technical field pertaining to the present disclosure, and non-limiting examples of the coating method may include a dip coating method, a die coating method, a roll coating method, a comma coating method, a doctor blade coating method, a reverse roll coating method and a direct roll coating method.

In the method for manufacturing a separator for a secondary battery according to an embodiment of the present disclosure, the particulate acrylic polymer having the glass transition temperature of 20° C. to 50° C. may have lower density than the inorganic particles. Accordingly, when the aqueous slurry is coated on the porous polymer substrate, the particles may move to the upper part of the inorganic particles and be disposed on the surface of the separator that contacts the electrode.

In contrast, the nonparticulate acrylic polymer does not move to the upper part of the inorganic particles and may get entangled with the inorganic particles and sink toward the porous polymer substrate. Accordingly, using the method for manufacturing a separator for a secondary battery according to an embodiment of the present disclosure, it is possible to form the first layer and the second layer together without need to performing a process of forming the second layer.

Additionally, since the particulate acrylic polymer may have lower density than the inorganic particles, the particulate acrylic polymer may move to the upper part of the inorganic particles, and thus the particulate acrylic polymer does not clog the pores of the first layer, thereby improving the air permeability and solving the resistance problem.

Subsequently, the coated aqueous slurry is dried.

In an embodiment of the present disclosure, the drying may be performed by a drying method commonly used in the manufacture of the separator. For example, in the drying of the coated aqueous slurry, temperature that is at least 10° C. higher than the glass transition temperature of the particulate acrylic polymer should not be transferred to the separator. When the drying condition is the same as described above, it is easier to remove the remaining dispersing medium without destroying the particulate shape of the particulate acrylic polymer.

As described above, the separator for a secondary battery which ensures good adhesion with the electrode and can solve the resistance problem may be manufactured by the method for manufacturing a separator for a secondary battery according to an embodiment of the present disclosure.

The separator for a secondary battery comprises two types of acrylic polymers: the particulate acrylic polymer having the glass transition temperature of 20° C. to 50° C. and the nonparticulate acrylic polymer having the glass transition temperature of 15° C. or less, thereby obtaining good adhesion of the separator with the electrode and ensuring adhesion between the first layer and the porous polymer substrate.

In an embodiment of the present disclosure, a secondary battery may be manufactured using the separator for a secondary battery according to the present disclosure.

The method for manufacturing a secondary battery according to an embodiment of the present disclosure comprises interposing the separator for a secondary battery between a positive electrode and a negative electrode, and laminating them by heat and pressure. The lamination may improve adhesion between the electrode and the separator by the shape change of the particulate acrylic polymer having the glass transition temperature of to 50° C., included in the second layer of the separator for a secondary battery.

In an embodiment of the present disclosure, the lamination may be performed at to 150° C., or 60° C. to 100° C., or 60° C. to 80° C. As the lamination is performed in the above-described temperature range, the particulate shape of the particulate acrylic polymer is changed, which makes it easier to obtain adhesion between the electrode and the separator.

Additionally, in an embodiment of the present disclosure, the lamination may be performed under the pressure of 3.5 MPa to 7.8 MPa.

In an embodiment of the present disclosure, the lamination may be performed under the temperature condition of 30° C. to 150° C. and the pressure condition of 3.5 MPa to 7.8 MPa.

In an embodiment of the present disclosure, for details of the positive electrode and the negative electrode, a reference is made to the following description.

In an embodiment of the present disclosure, the separator for a secondary battery may be interposed between the positive electrode and the negative electrode of the secondary battery, and may be interposed between adjacent cells or electrodes when constructing an electrode assembly by assembling a plurality of cells or electrodes. The electrode assembly may have a variety of structures, for example, simple stack type, jelly-roll type, stack-folding type, and lamination-stack type.

The secondary battery may be manufactured by the method for manufacturing a secondary battery as described above.

The secondary battery of the present disclosure may be preferably a lithium secondary battery. The lithium secondary battery may comprise a lithium metal secondary battery, a lithium ion secondary battery, a lithium polymer secondary battery or a lithium ion polymer secondary battery.

The electrode to be used with the separator for a secondary battery of the present disclosure is not limited to a particular type, and may be manufactured by binding an electrode active material to an electrode current collector by a common method known in the technical field pertaining to the present disclosure.

Of the electrode active material, non-limiting examples of the positive electrode active material may include layered compounds or compounds with one or more transition metal such as lithium cobalt composite oxide ($LiCoO_2$), lithium nickel oxide ($LiNiO_2$); lithium manganese oxide such as $Li_{1+x}Mn_{2-x}O_4$ (x=0~0.33), $LiMnO_3$, $LiMn_2O_3$, $LiMnO_2$; lithium copper oxide ($Li_2CuO_2$); vanadium oxide such as $LiV_3O_5$, $LiV_3O_4$, $V_2O_5$, $Cu_2V_2O_7$; Ni site lithium nickel oxide represented by formula $LiNi_{1-x}M_xO_2$ (M=Co, Mn, Al, Cu, Fe, Mg, B or Ga, x=0.01~0.3); lithium manganese composite oxide represented by formula $LiMn_{2-x}M_xO_2$ (M=Co, Ni, Fe, Cr, Zn or Ta, x=0.01~0.1) or $Li_2Mn_3MO_5$ (M=Fe, Co, Ni, Cu or Zn); $LiMn_2O_4$ with partial substitution of alkali earth metal ion for Li; disulfide compounds; and $Fe_2(MoO_4)_3$, but is not limited thereto.

Non-limiting examples of the negative electrode active material may include any negative electrode active material commonly used in the negative electrode of the electrochemical device, and in particular, may include lithium adsorption materials such as lithium metal or lithium alloy, carbon, petroleum coke, activated carbon, graphite or other carbons.

Non-limiting examples of the positive electrode current collector may include foils made of aluminum, nickel or a combination thereof, and non-limiting examples of the negative electrode current collector may include foils made of copper, gold, nickel or copper alloy or a combination thereof.

In an embodiment of the present disclosure, a conductive material used in the negative electrode and the positive electrode may be, in general, added in an amount of 1 weight % to 30 weight % based on the total weight of the active material layer, respectively.

The conductive material is not limited to any particular type when the material has conductivity while not causing a chemical change to the corresponding battery, and may include conductive materials, for example, graphite such as natural graphite or artificial graphite; carbon black such as acetylene black, ketjen black, channel black, furnace black, lamp black and thermal black; conductive fibers such as carbon fibers or metal fibers; fluorocarbon; metal powder such as aluminum powder and nickel powder; conductive whiskers such as oxide zinc and potassium titanate; conductive metal oxide such as titanium oxide; polyphenylene derivatives.

In an embodiment of the present disclosure, a binder used in the negative electrode and the positive electrode assists in binding the active material and the conductive material and binding the active material and the current collector, and in general, may be added in an amount of 1 weight % to 30 weight % based on the total weight of the active material layer, respectively. Examples of the binder may include polyvinylidene fluoride (PVdF), polyacrylic acid (PAA), polyvinyl alcohol, carboxymethyl cellulose (CMC), starch, hydroxypropyl cellulose, regenerated cellulose, polyvinylpyrrolidone, tetrafluoroethylene, polyethylene, polypropylene, ethylene-propylene-diene terpolymer (EPDM), sulfonated EPDM, styrene-butadiene rubber, fluorine rubber, and various types of copolymers.

In an embodiment of the present disclosure, the electrochemical device comprises an electrolyte solution, and the electrolyte solution may comprise an organic solvent and a lithium salt. Additionally, the electrolyte solution may comprise an organic solid electrolyte or an inorganic solid electrolyte.

For example, the organic solvent may include aprotic organic solvents such as N-methyl-2-pyrrolidone, ethylene carbonate, propylene carbonate, butylene carbonate, dimethyl carbonate, diethyl carbonate, gamma butyrolactone, 1,2-dimethoxy ethane, tetrahydroxy franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate and ethyl propionate.

The lithium salt is an material that is apt to dissolve in the organic solvent, and may include, for example, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloro borane lithium, lower aliphatic carboxylic acid lithium, lithium tetraphenyl borate and imide.

Additionally, to improve the charging/discharging characteristics and flame retardancy, for example, pyridine, triethylphosphite, triethanolamine, cyclic ether, ethylene diamine, n-glyme, triamide hexaphosphate, nitrobenzene derivatives, sulfur, quinone imine dye, N-substituted oxazolidinone, N,N-substituted imidazolidine, ethylene glycol dialkyl ether, ammonium salts, pyrrole, 2-methoxy ethanol and aluminum trichloride may be added to the electrolyte solution. In some cases, a halogen containing solvent such as carbon tetrachloride and trifluoroethylene may be added to give non-combustibility, and carbon dioxide gas may be added to improve high temperature storage characteristics.

For example, the organic solid electrolyte may comprise polyethylene derivatives, polyethylene oxide derivatives, polypropylene oxide derivatives, phosphoric acid ester polymer, poly agitation lysine, polyester sulfide, polyvinyl alcohol, polyvinylidene fluoride, and polymers containing ionic dissociation groups.

For example, the inorganic solid electrolyte may include nitrides, halides and sulfates of Li, for example, $Li_3N$, LiI, $LisNI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, $Li_3PO_4$—$Li_2S$—$SiS_2$.

The injection of the electrolyte solution may be performed in any suitable step of the battery manufacturing process according to a manufacturing process and required properties of a final product. That is, the injection of the electrolyte solution may be applied before battery assembly or in the final step of battery assembly.

In an embodiment of the present disclosure, a process of applying the separator for an electrochemical device to the battery may include the commonly used winding process as well as a lamination or stacking and folding process of the separator and the electrode.

Hereinafter, the present disclosure will be described in detail through examples and evaluation examples to help understanding of the present disclosure. However, the examples of the present disclosure may be modified in many other forms, and the scope of the present disclosure should not be construed as being limited to the following examples. The examples of the present disclosure are provided to fully explain the present disclosure to those having ordinary knowledge in the technical field to which the present disclosure pertains.

Example 1

Particulate acrylic polymer (weight ratio of butyl acrylate:styrene=7:3, glass transition temperature: 43° C., average particle size: 200 nm, true density: 1.02 g/cm$^3$), the nonparticulate acrylic polymer (weight ratio of 2-ethyl hexyl acrylate:methyl methacrylate=6:4, glass transition temperature: 8° C., true density: 1.05 g/cm$^3$) and aluminum hydroxide (Al(OH)$_3$) (Huber, average particle size: 800 nm, true density: 2.4 g/cm$^3$) were added to water as a dispersion medium at the weight ratio of 28.5:1.5:70, followed by milling at for 120 min using beads mill and dispersion to prepare an aqueous slurry. Here, water was added such that the total solids content is 40 weight %. The aqueous slurry was coated on one surface of a 9 μm thick polyethylene porous substrate (Toray) with the thickness of 3 μm by a bar coating method and dried at 60° C. to 80° C. for 30 sec to manufacture a separator for a secondary battery.

Example 2

A separator for a secondary battery is manufactured in the same way as example 1 except that particulate acrylic polymer (weight ratio of butyl acrylate:styrene=7.5:2.5, glass transition temperature: 40° C., average particle size: 380 nm, true density: 1.09 g/cm$^3$) was used instead of the particulate acrylic polymer (glass transition temperature: 43° C.) of example 1.

Example 3

A separator for a secondary battery was manufactured in the same way as example 1 except that particulate acrylic polymer (weight ratio of butyl acrylate:styrene=8.5:1.5, glass transition temperature: 30° C., average particle size: 180 nm, true density: 1.09 g/cm$^3$) was used instead of the particulate acrylic polymer (glass transition temperature: 43° C.) of example 1.

Example 4

A separator for a secondary battery was manufactured in the same way as example 1 except that nonparticulate acrylic polymer (weight ratio of 2-ethyl hexyl acrylate:methyl methacrylate=9.5:0.5, glass transition temperature: −40° C., true density: 1.02 g/cm$^3$) was used instead of the nonparticulate acrylic polymer (glass transition temperature: 8° C.) of example 1.

Comparative Example 1

A separator for a secondary battery was manufactured in the same way as example 1 except that the particulate acrylic polymer was not used.

Comparative Example 2

A separator for a secondary battery was manufactured in the same way as example 1 except that acrylic polymer (weight ratio of butyl acrylate:styrene=9.5:0.5, glass transition temperature: 0° C., true density: 1.02 g/cm$^3$) was used instead of the particulate acrylic polymer (glass transition temperature: 43° C.) of example 1.

The acrylic polymer does not have a particulate shape, which makes it difficult to measure the average particle size.

Comparative Example 3

A separator for a secondary battery was manufactured in the same way as example 1 except that acrylic polymer (weight ratio of butyl acrylate:styrene=9:1, glass transition temperature: 12° C., true density: 1.10 g/cm$^3$) was used instead of the particulate acrylic polymer (glass transition temperature: 43° C.) of example 1.

The acrylic polymer does not have a particular shape, which makes it difficult to measure the average particle size.

Comparative Example 4

A separator for a secondary battery was manufactured in the same way as example 1 except that particulate acrylic polymer (weight ratio of butyl acrylate:styrene=5:5, glass transition temperature: 60° C., average particle size: 360 nm, true density: 1.08 g/cm$^3$) was used instead of the particulate acrylic polymer (glass transition temperature: 43° C.) of example 1.

Comparative Example 5

A separator for a secondary battery was manufactured in the same way as example 1 except that the nonparticulate acrylic polymer was not used.

Evaluation Example 1: Shape Observation of Acrylic Polymer by Each Glass Transition Temperature FIGS. 2 to 7 show SEM images of the particulate acrylic polymer used in examples 1 to 3, the acrylic polymer having the glass transition temperature of 0° C. used in comparative example 2, the acrylic polymer having the glass transition temperature of 12° C. used in comparative example 3, and the particulate acrylic polymer used in comparative example 4, respectively.

It can be seen from FIGS. 2 to 7 that only the particulate acrylic polymer having the glass transition temperature of 20° C. or more have a particulate shape, and the acrylic polymers of comparative examples 2 and 3 having the glass transition temperature lower than 20° C. do not have a particular shape.

Evaluation Example 2: Evaluation of Characteristics of Second Layer Depending on Glass Transition Temperature of Acrylic Polymer The thickness, coating amount, air permeability and adhesion with electrode of the separators manufactured in examples 1 to 3 and comparative examples 1 to 4 were evaluated and the results are shown in Table 1.

Air Permeability Measurement Method

Air permeability (Gurley) was measured by ASTM D726-94 method. In this instance, the air permeability value was indicated by the time (sec) required for air of 100 cc to pass through the section of 1 in$^2$ of the separators manufactured in examples 1 to 3 and comparative examples 1 to 4 under the pressure of 12.2 inH$_2$O, i.e., air permeation time.

Evaluation Method of Adhesion Strength with Electrode

The adhesion strength between each of the separators manufactured in examples 1 to 3 and comparative examples 1 to 4 and the electrode was measured by the following method.

First, natural graphite, SBR, CMC and a conductive material (at the weight ratio of 90:2.5:2.5:5) were added to water to prepare a negative electrode slurry, and the negative electrode slurry was coated on a copper thin film (20 µm thick) in the loading amount of 5 mg/cm$^2$ and dried. Subsequently, it was press-rolled in the conditions of 90° C. 8.5 MPa and cut into the size of 60 mm (length)×25 mm (width) to manufacture a negative electrode.

The separators manufactured in examples 1 to 3 and comparative examples 1 to 4 were cut into the size of 70 mm (length)×25 mm (width), and laminated with the prepared negative electrode by using a press in the conditions of 60° C., 6.5 MPa, to manufacture samples. Each of the prepared samples was attached and fixed to a glass plate using a double-sided tape, and in this instance, the negative electrode was placed in contact with the glass plate. The separator part of the sample was peeled off 180° at the rate of 25 mm/min at 25° C., and the strength at that time was measured.

TABLE 1

| | Ex. 1 | Ex. 2 | Ex. 3 | Com. ex. 1 | Com. ex. 2 | Com. ex. 3 | Com. ex. 4 |
|---|---|---|---|---|---|---|---|
| Glass transition temperature of particulate acrylic polymer (° C.) | 43 | 40 | 30 | — | 0 | 12 | 60 |
| Average particle size of particulate acrylic polymer (nm) | 200 | 380 | 180 | — | — | — | 360 |
| True density of particulate acrylic polymer (g/cm$^3$) | 1.02 | 1.09 | 1.09 | — | 1.02 | 1.10 | 1.08 |
| Thickness of separator (µm) | 12.8 | 12.9 | 13.0 | 12.8 | 12.0 | 12.4 | 13.2 |

TABLE 1-continued

|  | Ex. 1 | Ex. 2 | Ex. 3 | Com. ex. 1 | Com. ex. 2 | Com. ex. 3 | Com. ex. 4 |
| --- | --- | --- | --- | --- | --- | --- | --- |
| Loading amount of slurry (g/cm$^2$) | 3.80 | 3.81 | 3.79 | 4.0 | 3.35 | 4.13 | 4.24 |
| Air permeability (Gurley) (sec/100 cc) | 151 | 114 | 160 | 120 | 387 | 476 | 118 |
| Adhesion strength with electrode (gf/25 mm) | 48.3 | 59.1 | 35.8 | 0 | 10.4 | 12.1 | 20.1 |

As can be seen from the above Table 1, examples 1 to 3 use the particulate acrylic polymer of a particulate shape having the glass transition temperature of 20° C. to 50° C., and it is possible the second layer comprising the particulate acrylic polymer to be formed on the upper surface of the first layer comprising the inorganic particles, so it can be seen that the adhesion strength with the electrode is good. Additionally, the particulate acrylic polymer does not clog the pores of the first layer, so it can be seen that air permeability is good.

Additionally, in the case of examples 1 and 2 using the particulate acrylic polymer having the average particle size of 200 nm or more, it can be seen that the adhesion strength with the electrode is much better than example 3 using the particulate acrylic polymer having the average particle size of less than 200 nm. Presumably, this is because when the separator and the electrode are stacked by lamination, as the particle size of the particulate acrylic polymer increases, the adhesion area with the electrode increases by the shape change of the particulate acrylic polymer.

In contrast, comparative example 1 uses only the nonparticulate acrylic polymer having the glass transition temperature of 15° C. or less, and does not use the particulate acrylic polymer having the glass transition temperature of 20° C. to 50° C., and thus the nonparticulate acrylic polymer gets entangled with the inorganic particles and sink down toward the porous polymer substrate, failing to form the second layer on the upper surface of the first layer, and it is difficult to ensure sufficient adhesion strength with the electrode.

In the case of comparative examples 2 and 3, two different types of acrylic polymers are used, but both the two acrylic polymers have the glass transition temperature of 15° C. or less and do not have a particulate shape, so they get entangled with the inorganic particles and sink down toward the porous polymer substrate, failing to form the second layer on the upper surface of the first layer. Additionally, both the two types of acrylic polymers do not exhibit a particulate shape, causing clogged pores of the first layer, so it can be seen that the air permeation time is long.

Since comparative example 4 uses the particulate acrylic polymer of a particulate shape having the glass transition temperature of 20° C. or more, and it is possible the second layer to be formed on the upper surface of the first layer, but since the glass transition temperature of the particulate acrylic polymer is higher than 50° C., the particulate shape is not changed in the lamination step of the electrode and the separator, which makes it difficult to ensure sufficient adhesion strength with the electrode.

Evaluation Example 3: Measurement of Adhesion Strength Between First Layer and Porous Polymer Substrate The adhesion strength between the first layer and the porous polymer substrate in the separators manufactured in examples 1 and 4 and comparative example 5 was measured and the results are shown in Table 2.

Each of the separators manufactured in examples 1 and 4 and comparative example 5 was fixed onto a glass plate using a double-sided tape, a tape (3M transparent tape) was firmly attached to the exposed first layer, and the adhesion strength between the first layer and the porous polymer substrate of the separator was measured as a force (gf/15 mm) necessary to peel off the tape using 1 loyd LS-1.

TABLE 2

|  | Example 1 | Example 4 | Comparative example 5 |
| --- | --- | --- | --- |
| Peel strength (gf/15 mm) | 47.1 | 46.4 | 0 |

As can be seen from the above Table 2, it can be seen that examples 1 and 4 have sufficient adhesion strength between the first layer and the porous polymer substrate. Presumably, this is because the nonparticulate acrylic polymer having the glass transition temperature of 15° C. or less get entangled with the inorganic particles and sink down toward the porous polymer substrate, inducing the first layer and the porous polymer substrate kept in bonded state.

In contrast, in the case of comparative example 5, it can be seen that it is difficult to ensure sufficient adhesion strength between the first layer and the porous polymer substrate. Presumably, this is because the particulate acrylic polymer having the glass transition temperature of 20° C. to 50° C. does not get entangled with the inorganic particles and sink down toward the porous polymer substrate, so there is no material having the ability to obtain the adhesion strength between the porous polymer substrate and the first layer.

What is claimed is:

1. A separator for a secondary battery, comprising:
   a porous polymer substrate;
   a first layer on at least one surface of the porous polymer substrate,
   wherein the first layer comprises inorganic particles and a nonparticulate acrylic polymer having a glass transition temperature of 15° C. or less, wherein the nonparticulate acrylic polymer connects and fixes the inorganic particles; and
   a second layer on an upper surface of the first layer,
   wherein the second layer comprises a uniform particulate acrylic polymer, wherein the uniform particulate acrylic polymer has a glass transition temperature in a range of 20° C. to 50° C.,
   wherein in the first layer and the second layer, a slurry containing the inorganic particles, the nonparticulate acrylic polymer, and the uniform particulate acrylic polymer is coated on at least one surface of the porous polymer substrate, and the uniform particulate acrylic polymer has a lower density than the inorganic particles to move to an upper part of the inorganic particles so that the second layer is formed on the upper surface of the first layer.

2. The separator for the secondary battery according to claim 1, wherein the glass transition temperature of the nonparticulate acrylic polymer is 0° C. or less.

3. The separator for the secondary battery according to claim 1, wherein the nonparticulate acrylic polymer comprises a repeating unit comprising a first monomer and a repeating unit comprising a second monomer, and
wherein a glass transition temperature of the first monomer is higher than a glass transition temperature of the second monomer.

4. The separator for the secondary battery according to claim 3, wherein the first monomer comprises at least one of methyl methacrylate, ethyl methacrylate, n-butyl methacrylate, isobutyl methacrylate, or t-butyl methacrylate.

5. The separator for the secondary battery according to claim 3, wherein the second monomer comprises at least one of 2-ethyl hexyl methacrylate, lauryl methacrylate or octadecyl methacrylate.

6. The separator for the secondary battery according to claim 3, wherein the repeating unit comprising the second monomer is present in an amount of 60 weight % or more based on 100 weight % of the nonparticulate acrylic polymer.

7. The separator for the secondary battery according to claim 1, wherein the uniform particulate acrylic polymer comprises a repeating unit comprising a third monomer and a repeating unit comprising a fourth monomer, and
wherein a glass transition temperature of the third monomer is higher than a glass transition temperature of the fourth monomer.

8. The separator for the secondary battery according to claim 7, wherein the third monomer comprises at least one of styrene, vinyl acetate or acrylonitrile.

9. The separator for the secondary battery according to claim 7, wherein the fourth monomer comprises at least one of methyl acrylate, ethyl acrylate, butyl acrylate, isobutyl acrylate, 2-ethyl hexyl acrylate or ethylene.

10. The separator for the secondary battery according to claim 7, wherein a weight ratio of the repeating unit comprising the third monomer to the repeating unit comprising the fourth monomer is 1.5:8.5 to 4:6.

11. The separator for the secondary battery according to claim 1, wherein an average particle size of the uniform particulate acrylic polymer is in a range of 200 nm to 800 nm.

12. The separator for the secondary battery according to claim 1, wherein a ratio of a density of the uniform particulate acrylic polymer to a density of the inorganic particles is 0.5 or less.

13. The separator for the secondary battery according to claim 1, wherein a density of the uniform particulate acrylic polymer is 1.5 g/m$^3$ or less.

14. The separator for the secondary battery according to claim 1, wherein a density of the inorganic particles is 2.0 g/m$^3$ or more.

15. The separator for the secondary battery according to claim 1, wherein the separator for the secondary battery has an adhesion strength with an electrode of 30 gf/25 mm to 200 gf/25 mm.

16. The separator for the secondary battery according to claim 1, wherein an air permeability of the separator for the secondary battery is in a range of 10 sec/100 cc to 300 sec/100 cc.

17. The separator for the secondary battery according to claim 1, wherein an adhesion strength between the porous polymer substrate and the first layer is 10 gf/15 mm to 300 gf/15 mm.

18. A secondary battery, comprising:
a positive electrode,
a negative electrode, and
a separator interposed between the positive electrode and the negative electrode,
wherein the separator is the separator for the secondary battery according to claim 1.

19. A method for manufacturing a secondary battery comprising:
(S1) preparing a porous polymer substrate;
(S2) preparing an aqueous slurry comprising inorganic particles, a nonparticulate acrylic polymer having a glass transition temperature of 15° C. or less, and a uniform particulate acrylic polymer, wherein the uniform particulate acrylic polymer has a glass transition temperature in a range of 20° C. to 50° C.;
(S3) coating the aqueous slurry on at least one surface of the porous polymer substrate; and
(S4) drying the result of the (S3),
wherein the nonparticulate acrylic polymer adheres the inorganic particles to each other to keep the inorganic particles held together, and
wherein the uniform particulate acrylic polymer has a lower density than the inorganic particles to move to an upper part of the inorganic particles so that a second layer is formed on an upper surface of a first layer including the inorganic particles.

20. The method for manufacturing a secondary battery according to claim 19, wherein a ratio of a density of the uniform particulate acrylic polymer to a density of the inorganic particles is 0.5 or less.

* * * * *